United States Patent
Holcombe et al.

(10) Patent No.: US 7,868,294 B2
(45) Date of Patent: Jan. 11, 2011

(54) APPARATUS AND METHOD FOR DISPLAY CONTROL USING AMBIENT LIGHT MEASUREMENT SIGNAL FROM AN INFRARED RECEIVER

(75) Inventors: Wayne T. Holcombe, Mountain View, CA (US); Miroslav Svajda, Sunnyvale, CA (US)

(73) Assignee: Silicon Laboratories Inc., Austin, TX (US)

( * ) Notice: Subject to any disclaimer, the term of this patent is extended or adjusted under 35 U.S.C. 154(b) by 183 days.

(21) Appl. No.: 12/270,647

(22) Filed: Nov. 13, 2008

(65) Prior Publication Data

US 2009/0127461 A1    May 21, 2009

Related U.S. Application Data

(60) Provisional application No. 60/988,248, filed on Nov. 15, 2007.

(51) Int. Cl.
*G01J 5/00*    (2006.01)

(52) U.S. Cl. .................................. 250/338.1; 345/207
(58) Field of Classification Search ................. 345/207; 250/338.1
See application file for complete search history.

(56) References Cited

U.S. PATENT DOCUMENTS

2005/0190142 A1* 9/2005 Ferguson ..................... 345/102
2008/0219672 A1* 9/2008 Tam et al. .................... 398/130

* cited by examiner

*Primary Examiner*—Constantine Hannaher
(74) *Attorney, Agent, or Firm*—Howison & Arnott, LLP

(57) ABSTRACT

A system having an infrared receiver is shown, where the system includes an infrared receiver circuit configured to receive an infrared data signal using a receive photodiode and compensate for an ambient light level incident on the receive photodiode by generating a DC ambient current signal, where the DC ambient current signal is accessible external to the infrared receiver circuit. The system also includes a control circuit configured to receive the DC ambient current signal and, responsive thereto, determine the ambient light level and generate a display illumination control signal accordingly.

20 Claims, 4 Drawing Sheets

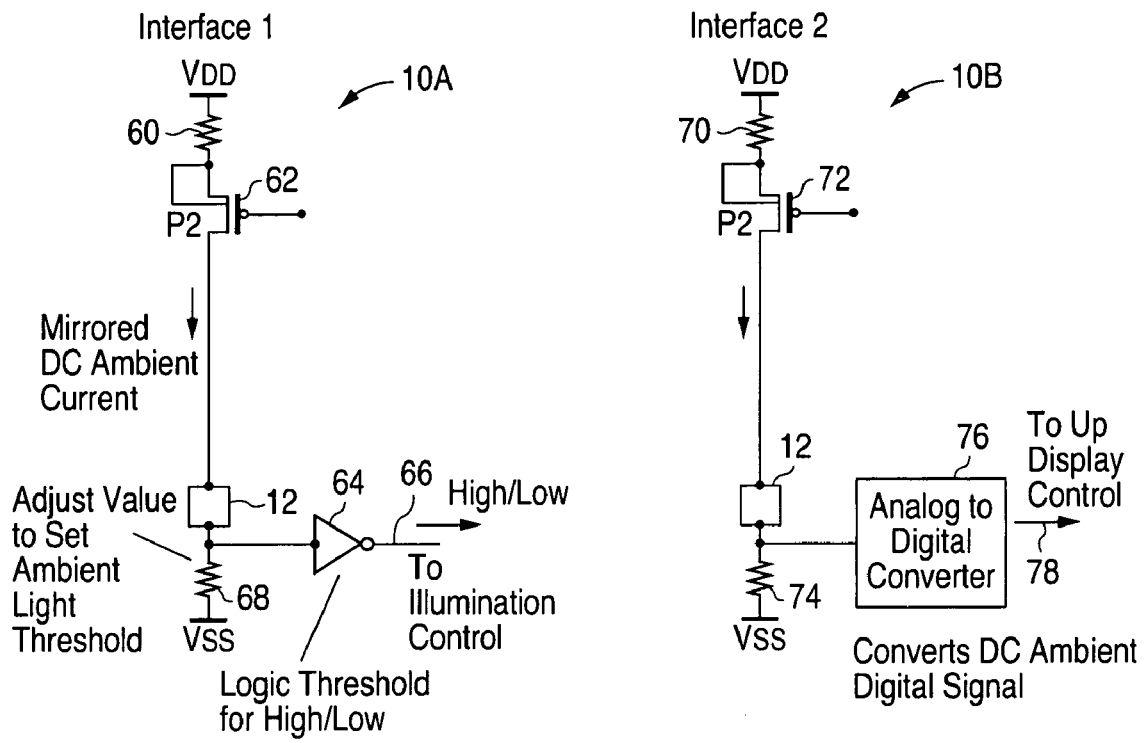
FIG. 2   FIG. 3
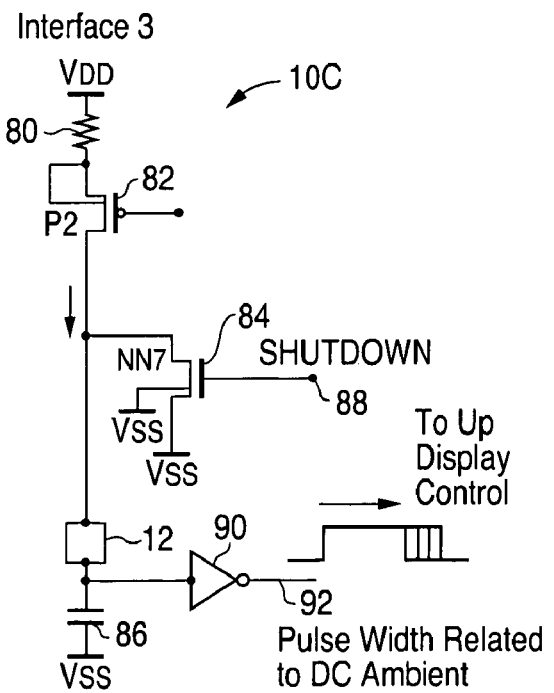
FIG. 4

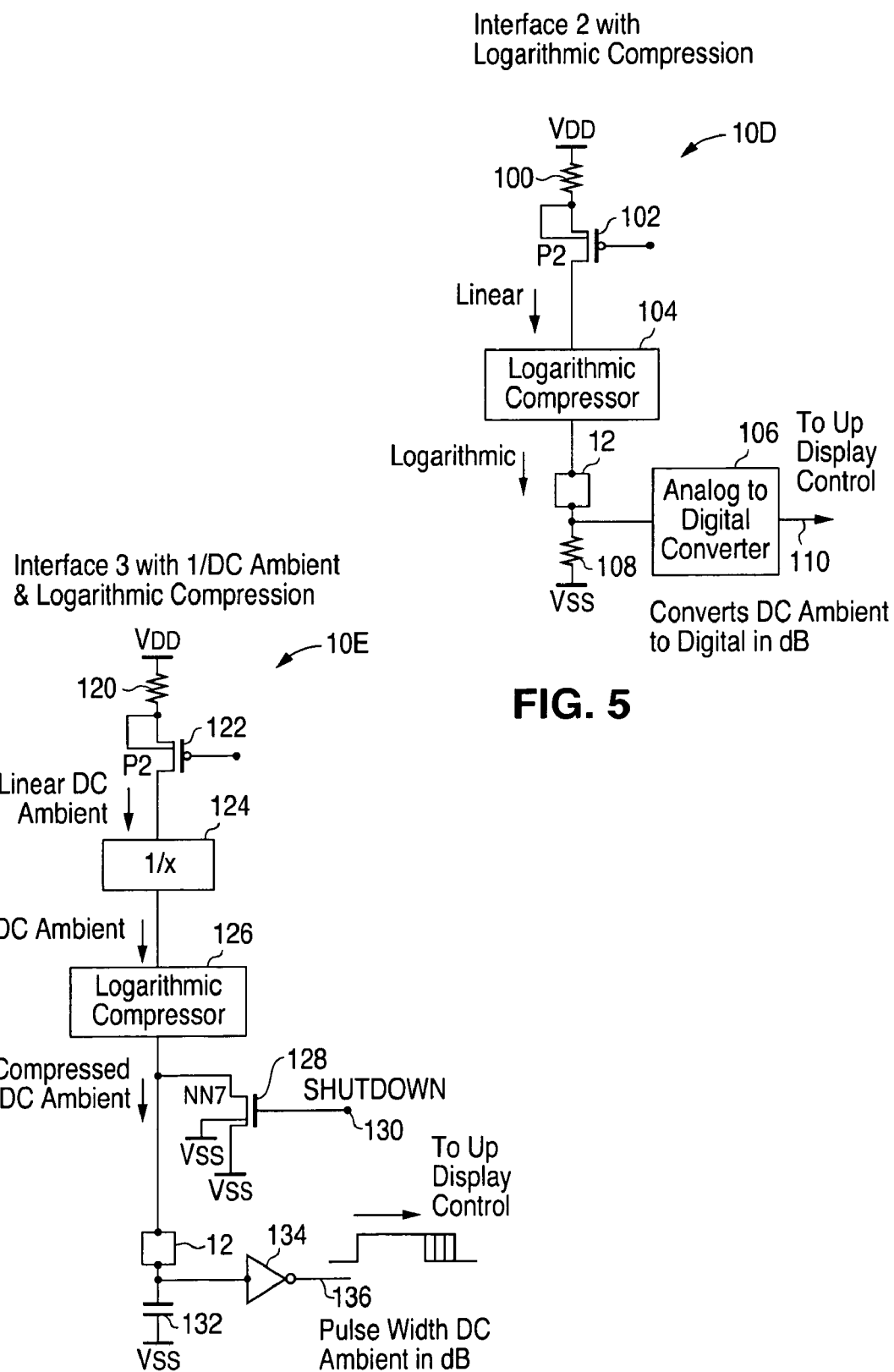

APPARATUS AND METHOD FOR DISPLAY CONTROL USING AMBIENT LIGHT MEASUREMENT SIGNAL FROM AN INFRARED RECEIVER

CROSS-REFERENCE TO RELATED PATENT APPLICATIONS

This patent application claims the benefit of U.S. Provisional Patent Application No. 60/988,248, filed Nov. 15, 2007.

FIELD OF THE INVENTION

This invention pertains to infrared electronics and, more particularly, infrared data transceivers that can detect ambient light.

BACKGROUND OF THE INVENTION

A conventional Infrared Data Association (IrDA) based optical communication transceiver in a module typically provides 115.2 Kbps to 16 Mbs transfer of data transfer over distances less than one meter. IrDA transceivers have 30% penetration in Asian and European cell phone markets and 100% of the PDA (Personal Digital Assistants) market. In year 2006, the total market for IrDA transceivers exceeded 250 million units. IrDA transceivers are conventionally mounted in products behind an infrared transparent window.

Presently, most IrDA transceivers are installed on battery operated handheld devices, primarily cellular telephones and, secondarily, PDAs. These devices typically use high resolution displays. The most common types are backlit liquid crystal displays (LCDs) and active illumination displays. However, these displays typically suffer from poor readability in daylight conditions due to insufficient levels of backlight or active illumination. More expensive reflective displays are better suited for daylight viewing and don't require backlit illumination except for night viewing. With continuing improvements in both white light emitting diode (LED) and active display efficiency and illumination, providing sufficient lighting power for outside daylight viewing can be achieved with little increase in display illumination cost. However, this significantly increases power consumption and typically makes the display excessively bright for night or standard indoor lighting levels.

BRIEF SUMMARY OF THE INVENTION

In one embodiment, an IrDA transceiver circuit 200 is configured to output an ambient light signal 12 representing an intensity of ambient light incident on a photodiode 14 of the IrDA transceiver 200. The ambient light signal 12 is utilized by a control circuit to generate a brightness control signal suitable for output to a display device 202. In one refinement, the control circuit is a microprocessor 204. In another refinement, the control circuit is control logic 206 that transforms the ambient light signal 12 into the brightness control signal form required by the display device 202.

In one embodiment according to one aspect of the present invention, an infrared receiver circuit is configured to generate an ambient light output signal at an output pin, where the receiver circuit has an ambient correction current transistor with a first current terminal coupled to a first power supply rail, a second current terminal for coupling to a receive photodiode, and a control terminal. An ambient correction amplifier has an output coupled to the control terminal of the ambient correction current transistor, a first input, and a second input coupled to a reference voltage source. A capacitor is coupled between the output of the ambient correction amplifier and the first power supply rail. A transimpedance amplifier has an output coupled to the first input of the ambient correction amplifier through a first resistor, a first input coupled to the second current terminal of the ambient correction current transistor and coupled to the output of the transimpedance amplifier through a second resistor, and a second input coupled to the reference voltage source. An output transistor has a first current terminal coupled to the first power supply rail, a second current terminal coupled to the output pin, and a control terminal coupled to the control terminal of the ambient correction current transistor.

In another embodiment of the present invention, an infrared system includes an infrared receiver circuit configured to receive an infrared data signal using a receive photodiode and compensate for an ambient light level incident on the receive photodiode by generating a DC ambient current signal, where the DC ambient current signal is accessible external to the infrared receiver circuit. The system also includes a control circuit configured to receive the DC ambient current signal and, responsive thereto, determine the ambient light level and generate a display illumination control signal accordingly. In one refinement of the system, the control circuit further comprises a processor. In a further refinement, the processor is configured to monitor the DC ambient current signal to detect outdoor light conditions and adjust the display illumination control signal for outdoor light conditions. In still a further refinement, the processor is further configured to monitor the DC ambient current signal for amplitude modulation to detect amplitude modulation corresponding to indoor light conditions and adjust the display illumination control signal for indoor light conditions.

An embodiment of a method for display illumination control in a system having an infrared receiver, according to the present invention, calls for providing an infrared receiver circuit for receiving an infrared data signal and compensating for an ambient light level by generating a DC ambient current signal in the infrared receiver circuit. The method also sets forth determining the ambient light level from the DC ambient current signal and generating a display illumination control signal based on the ambient light level determined from the DC ambient current signal. In a further refinement, the step of determining the ambient light level from the DC ambient current signal includes monitoring the DC ambient current signal to detect outdoor light conditions and the step of generating a display illumination control signal based on the ambient light level determined from the DC ambient current signal further comprises adjusting the display illumination control signal for outdoor light conditions. In another refinement, the step of determining the ambient light level from the DC ambient current signal includes monitoring the DC ambient current signal for amplitude modulation to detect amplitude modulation corresponding to indoor light conditions and the step of generating a display illumination control signal based on the ambient light level determined from the DC ambient current signal further comprises adjusting the display illumination control signal for indoor light conditions. In yet another refinement, the method calls for accessing the DC ambient current signal externally to the infrared receiver circuit and providing a control circuit external to the infrared receiver circuit for converting the DC ambient current signal to the display illumination control signal.

BRIEF DESCRIPTION OF THE DRAWINGS

Certain exemplary embodiments of the present invention are described below with reference to the following figures, wherein:

FIG. 2 is a schematic circuit diagram that shows an embodiment of an output interface circuit that includes a logic buffer detection circuit that converts the mirrored DC ambient current for the ambient light level signal to a binary digital signal.

FIG. 3 is a schematic circuit diagram that shows an additional embodiment of an output interface circuit that includes an analog to digital converter for converting the mirrored DC ambient current for the ambient light level signal to a digital value suitable for use by a processor for display control.

FIG. 4 is a schematic circuit diagram that shows an additional embodiment of an output interface circuit that includes a pulse width encoder that converts the mirrored DC ambient current for the ambient light level signal to a pulse width modulated signal.

FIG. 5 is a schematic circuit diagram that shows an embodiment of an output interface circuit that includes an analog to digital converter for converting the mirrored DC ambient current for the ambient light level signal to a logarithmically compressed digital value expressed in decibels (dB).

FIG. 6 is a schematic circuit diagram that shows an embodiment of an output interface circuit that includes logarithmic and reciprocal compression that causes the ambient light level signal output to be expressed as a pulse width modulated signal with the width either in a decibel representation of the inverse of the ambient light level.

DETAILED DESCRIPTION OF THE INVENTION

Figure 1:
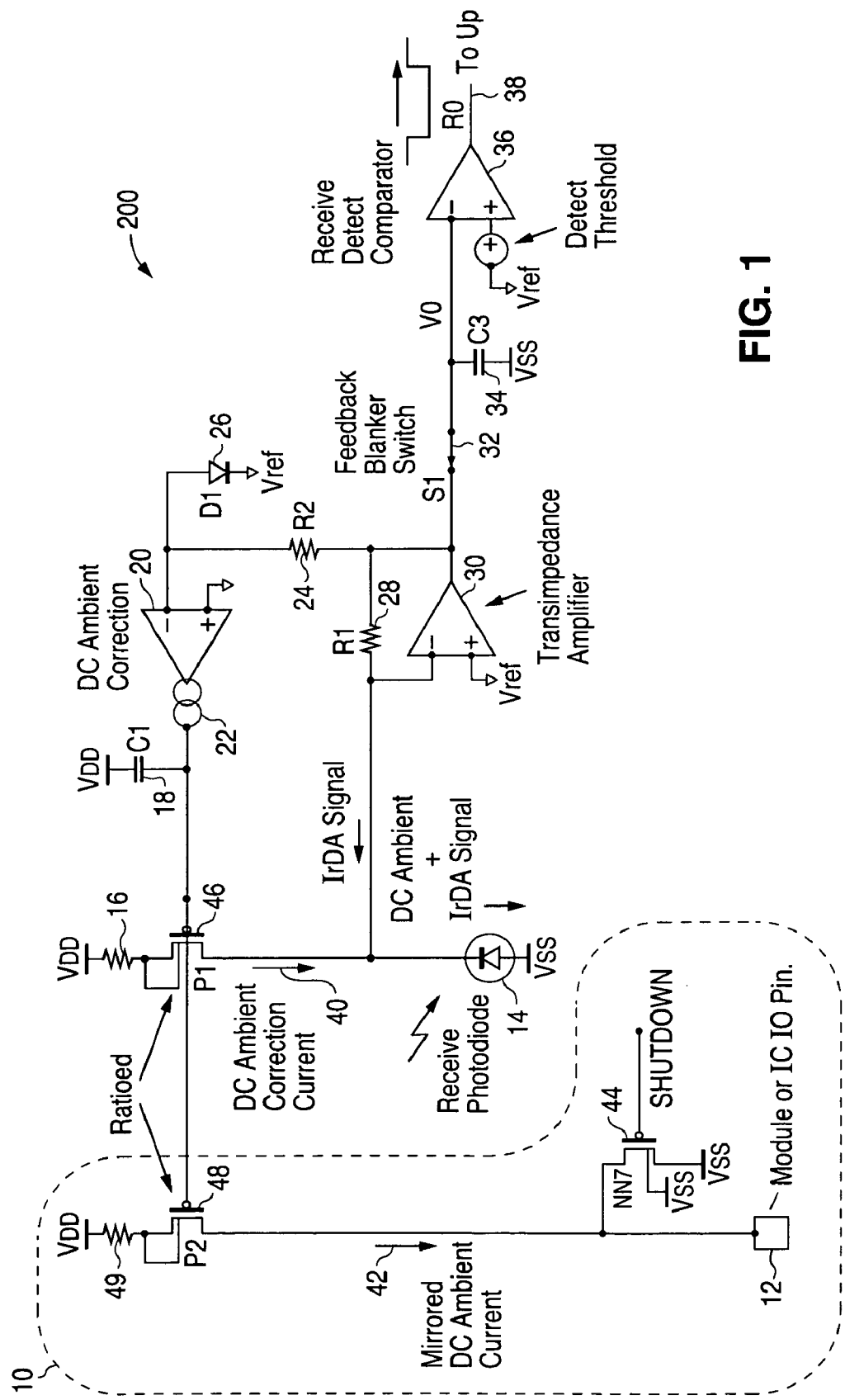
FIG. 1 is a schematic circuit diagram of an embodiment of an IrDA receiver 200 that generates an ambient light level output signal.

One method for dealing with various ambient light viewing levels with handheld display products is to add an ambient light sensor, typically a photodiode or phototransistor, to a product to measure the background ambient light level and adjust the display illumination as a function of the output of the sensor. For transmission LCD displays or active illumination displays, when the display is in use, the backlight level would increase as the ambient light level increases. In daylight exposure levels, the display illumination levels are increased significantly, e.g. by five to ten fold. By providing increased illumination levels only when needed by the user, battery consumption can be managed. Since the percentage of time spent viewing a display outdoors is often low, the associated increased power levels used to brighten the display won't significantly reduce battery life. For night time viewing, a minimum illumination level is set. For reflective LCD displays, the backlight is normally off for daytime viewing and only comes on when dark. Consequently, many handheld displays can benefit from ambient light sensing display brightness control.

Not all handheld devices have automatic background light compensation for displays. One factor preventing wider application of light compensation may be the added product complexity and the incremental cost of the background ambient light sensor, as well as the need to add an optically transparent window to the product case. Because low cost, high volume handheld displays have advanced beyond displaying a few lines of text necessary for basic functions, such as cell phone dialing, to full computer monitor resolution necessary for web browsing and maps, the readability of these displays under variable light conditions has become more important.

An infrared receiver circuit is configured to output an ambient light signal representing an intensity of ambient light incident on a photodiode of the IrDA transceiver. The ambient light signal is utilized by a control circuit to generate a brightness control signal suitable for output to a display device. In one refinement, the control circuit is a microprocessor. In another refinement, the control circuit is control logic that transforms the ambient light signal into the brightness control signal form required by the display device. The improved IrDA transceiver generates both the ambient light level signal and the usual decoded IrDA communications signal using common circuitry for the light detection and DC correction. By eliminating additional detection circuitry and associated optical window insert, these embodiments may result in a lower cost and physically smaller solution than prior art solutions.

In certain exemplary embodiments, a method and apparatus is shown that includes an ambient light sensor functionality, such as a daylight sensor, in an IrDA transceiver at nominal additional cost by utilizing an ambient light correction circuit in the IrDA transceiver and its optical window access in order to generate an additional ambient light output signal that indicates the ambient light level sensed by the IrDA transceiver. This signal can be used to control a display device, such as by changing brightness, backlighting, or reflectivity, to improve the display output for viewing in the current lighting conditions. The IrDA transceiver generates the ambient light level signal in addition to its usual decoded IrDA communications signal output. The improved IrDA transceiver generates both signals using common circuitry for the light detection and DC correction. The resulting system only requires one optical window insert, which may be the same optical window utilized by the IrDA transceiver for infrared communication. This is in contrast to prior art, which typically utilizes a separate ambient light detector circuit along with an additional optical window insert with filter properties specifically suited to ambient light detection. By eliminating the additional detection circuitry and optical window insert, these embodiments may result in lower cost and a physically smaller solution than prior art solutions.

One aspect of the present invention is directed toward providing automatic light compensation at low cost. In one embodiment, an ambient light sensor or a daylight sensor is provided in an IrDA transceiver at low cost by including an ambient light correction circuit in the IrDA transceiver and detecting the ambient light level through an optical window access.

The receiver portion of an infrared receiver system, in order to achieve sufficient sensitivity typically reduces or removes the DC current (typically from 10 nA to over 500 uA) from the input photodiode signal current. Removal of DC current is especially important in baseband systems. The DC current, also called the DC ambient level, arises from the ambient background light. The transmitted data signal rides on top of the DC ambient light level. Infrared systems typically use infrared optical filters to block visible light to reduce the total DC ambient level. This is important since excessive DC ambient levels may overload the IrDA receiver. Even if the receiver doesn't overload, the shot noise of the photodiode is proportional to the square root of the DC ambient photo current. Therefore it improves receiver sensitivity to reduce DC ambient by filtering all light outside of the wavelength being transmitted. In practice, low cost infrared filters typically filter out visible light and allow all infrared bands to fall on the photodiode.

Infrared receiver circuits often use a low noise gyrator current source to cancel the input current arising from the DC ambient. One embodiment of an infrared receiver is shown in FIG. 1, which utilizes a gyrator circuit that includes transconductance amplifier 20, capacitor 18, transistor 46, and resistor 16 coupled to power supply rail VDD. The gyrator acts like an inductor that has low impedance at DC or low ambient frequencies. The gyrator provides a DC ambient correction signal 40 that is the low frequency average of the DC component of the current through photodiode 14. At higher signal frequencies, the gyrator becomes unresponsive so that it does not cancel high frequency components. Without the DC ambient correction, transimpedance amplifier 30 would typically overload at high gain levels and, at low gain, would not provide enough sensitivity to provide a useful communication range.

The receiver circuit 200 has an output circuit 10 that includes transistor 48 coupled between power supply rail VDD and integrated circuit input/output (IO) pin 12 in series with resistor 49. Output transistor 48 has a current flow 42 that mirrors the DC ambient correction current 40 flowing through transistor 46, either directly or in some proportion determined by the ratio of size between transistors 46 and 48. The mirrored current 42 from transistor 48 flows to the module or integrated circuit input/output (IO) pin 12 where it is accessible as an output signal that indicates the ambient light level. A shutdown transistor 44 is included that sinks the output current from transistor 48 to shutdown the circuit.

Amplifier 36 is configured as a receive detection comparator that compares the signal output by amplifier 30 to a reference voltage Vref. The output 38 of amplifier 36 is the decoded infrared data signal received by the receiver section of the IrDA transceiver 200 using the receive photodiode 14.

Although infrared designers typically know that a background infrared DC ambient signal may be available, the conventional wisdom is that the signal is not suitable for display illumination control. This conventional conclusion arises because infrared receivers generally have an infrared optical filter designed to block visible light. Conventional infrared filtering is achieved with dye additives to clear packaging plastic and infrared plastic window inserts on the case of the end product. These low cost plastic filters typically pass infrared wavelengths above about 800 nm and block shorter visible wavelengths and ultraviolet. The silicon photodiode used in infrared receivers is often unresponsive to light with wavelengths above about 1100 nm. Consequently, a standard IrDA receiver typically has an infrared response range of approximately 800 nm to 1100 nm.

Counter-intuitively, as long as this infrared bandwidth is available, it is possible to determine whether or not the illumination is from outside daylight, especially direct sunlight. The reason that sunlight may be distinguished from other sources of ambient light is that 45% of sunlight is infrared, 50% visible, and the remaining 5% ultraviolet. About 60% of direct daylight infrared is in the band from 800 nm to 1100 nm. Although incandescent bulbs have several times higher percentage of infrared light than sunlight, a much larger percentage is beyond a wavelength of 1100 nm than for sunlight. Typically, at the same LUX level (LUX is the standard measure of visible illumination intensity) the infrared in the 800 nm to 1100 nm band for direct sunlight is about half of that from a standard incandescent light bulb. In the shade, the sunlight value is about one tenth of the incandescent bulb infrared. However, outside sunlight is many times brighter than indoor lighting. Direct sunlight is around 30K to 1300K LUX, in the shade it's about 5K to 1K LUX, and indoor illumination is in the 500 LUX to 50 LUX range. Consequently, the infrared level in the 800 nm to 1100 nm band for direct sunlight is at least ten times greater than from indoor incandescent lighting. Only for shaded sunlight versus standard indoor incandescent lighting are the infrared levels similar.

In addition, for energy conservation reasons, the use of relatively inefficient incandescent lighting is expected to decline. Many commercial buildings use fluorescent lighting, which has extremely low infrared levels, or some other type of energy efficient lighting that has infrared levels below that of sunlight.

It is also possible to differentiate between infrared in shaded sunlight versus infrared from indoor incandescent lights. Incandescent light has amplitude modulated intensity with a peak to peak ripple at twice the main power line frequency, which is typically about 10% of the average DC value. Sunlight infrared has essentially no amplitude modulation. Consequently, it is possible to identify whether moderate levels of infrared DC ambient is coming from sunlight or incandescent lighting. Also, note that photodiodes typically are capable of receiving a spectrum of light, which may include both visible and infrared light. Further, some photodiodes or photodetectors are configured to have a spectral response that can discriminate between different wavelengths and, therefore, different sources of ambient light, e.g. incandescent, fluorescent or sunlight.

This means that when an infrared filter is used, the DC ambient signal can provide useful proportional display brightness control for outdoor sunlight use from shade to direct sunlight. Once the infrared level falls below the value associate with sunlight shade or indoor incandescent, the display would assume a default indoor illumination level since indoor infrared levels are not well correlated to illumination levels. Generally, a fixed lower level is acceptable for both indoor and night time illumination.

In one embodiment, contrary to conventional practice, the IrDA transceiver/photodiode 14 is packaged using a clear package and having a clear window on the product case, contrary to conventional practices of using a package that filters visible light. Indoor proportional light control can be achieved using this combination because the photodiode response will include a significant percentage of the visible light spectrum allowing it to measure visible ambient conditions. An IrDA receiver and photodiode do not need to be packaged in infrared filter plastic in order to meet IrDA specifications. The infrared filtering typically improves IrDA receiving performance by eliminating the visible light contribution to the DC ambient current level. DC current creates shot noise in the photo-diode, which typically degrades the signal to noise ratio and causes the receiver to reduce gain to prevent spurious detection. In typical indoor light environments, the photodiode current arising from visible DC ambient levels is relatively low, typically resulting in only a few decibels (dB) reduction in sensitivity. In most indoor applications, a reduction in receive range is not noticeable unless the IrDA transceiver function is operated with direct exposure from a high intensity desk lamp. Even for this unlikely condition, a user could just reduce range until the IrDA application software signals that the devices are within range.

Finally, the infrared filtered DC ambient sensor as a sunlight infrared sensor may offer an advantage if it is mounted near the display whose illumination it is controlling. A visible light sensor can get optical feedback from the same display illumination that it is controlling while the infrared filter blocks the visible light, consequently it is unaffected by feedback from the display (since the display illumination has very low infrared content) and is only responsive to the infrared ambient.

By outputting a ratioed or mirrored value of the DC ambient correction signal on an I/O pin of an IrDA module, the DC ambient value is available to be measured or compared for display brightness control or other functions where it is useful to know if the device is in daylight. Three useful interface methods are supported by this.

FIG. 2 shows an alternative embodiment 10A of the output circuit 10 of FIG. 1, wherein an interface is provided for utilizing the ambient light signal shown that functions by adjusting the resistor 68 to ground to a set value. The voltage on the resistor 68 can directly drive a digital complementary metal-oxide semiconductor (CMOS) 64 input for binary detection of ambient level above or below a fixed threshold. The output 66 of the logic buffer 64 may then be used as a control signal for display illumination by, for example, a microprocessor or a display control circuit. For example, if the voltage rises above the logic threshold, which may indicate operation in direct sunlight or bright shade, then the display illumination may be increased, e.g to a five to ten times higher value, in order to allow readability under these conditions.

FIG. 3 shows another alternative embodiment 10B of the output circuit 10 of FIG. 1, wherein the mirrored DC ambient current is directly measured by a current analog to digital converter 76 to produce a digital ambient light level signal 78 that may be output to an external controller, such as a microprocessor 204, that utilizes the digital signal 78 to control the illumination level of the display 202. Alternatively, the DC ambient current may be passed through a resistor 74 to ground and a voltage analog to digital converter 76 used to measure the voltage on the resistor 74 in order to produce the digital signal 78 used by the external controller. In addition, the resistor 74 may be an element external to the transceiver integrated circuit and the resistor value may be used to set the current to voltage gain.

Still another embodiment of an interface 10C for utilizing an ambient light signal 12 is shown in FIG. 4. In FIG. 4, a pulse width encoder circuit is shown wherein the transceiver circuit I/O pin output 12 is shorted to ground by transistor 84 when the IrDA transceiver 200 is shutdown and capacitor 86 to ground is connected to the DC ambient output pin 12. When the transceiver circuit 200 is enabled, the time required for the capacitor 86 to charge up to the logic threshold is inversely proportional to the DC ambient current at output pin 12. The value of capacitor 86 effectively calibrates the output current to time relationship. The digital logic 90 driven by the logic threshold measures the pulse width with an internal counter as a low cost, convenient method to digitally convert the analog DC ambient current signal 12 to a digital pulse width encoded signal 92. In this embodiment, the DC ambient signal 12 is inversely proportional to the width of pulse width encoded signal 92.

FIG. 5 shows another alternative embodiment 10D of the output circuit 10 of FIG. 1, wherein, instead of a linear value being produced for the digital ambient light level signal as in FIG. 3, the DC ambient current output signal 12 is logarithmically compressed. Each fixed increase in current represents a fixed ratio increase in DC ambient. This creates a digital output 110 in a linear decibel scale format. This form may be more useful due to the large dynamic range of normal illumination intensity, which can exceed a ratio of one thousand to one.

FIG. 6 shows another alternative embodiment 10E of the output circuit 10 of FIG. 1, wherein an analog reciprocal circuit 124 outputs a current that is inversely proportional to the DC ambient current. As a result, an increase in DC ambient current causes the output current to go down. When the output current is electrically coupled to a capacitor 132, the pulse width encoded output signal 136 has a pulse width that increases with increasing DC ambient current levels. In addition, the inverse current can be logarithmically compressed with logarithmic compressor 126 so that linear pulse width changes represent the ambient light level in decibel ratios.

Figure 7:
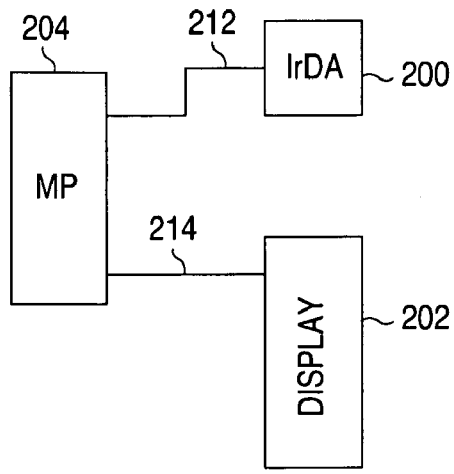
FIG. 7 is a functional block diagram illustrating an embodiment of a system having an infrared receiver wherein an ambient light signal output from an IrDA transceiver is utilized by a microprocessor to generate a brightness control signal that is output to a display device.

FIG. 7 is a functional block diagram illustrating an embodiment wherein an ambient light signal 212 from IrDA receiver or transceiver 200 is utilized by a microprocessor 204 to generate a brightness control signal 214 that is output to a display device 202. In this embodiment, the ambient light signal 212 from the IrDA transceiver 200 is either a digital value or is transformed into a digital value, such as by using one of the techniques discussed above with respect to FIGS. 2-6 or other techniques known to those of skill in the art.

Responsive to the ambient light signal 212, the microprocessor controls the value of the brightness control signal 214 that is output to the display device 202. The microprocessor 204 may apply a variety of control algorithms to the ambient light signal 212 value in generating the brightness control signal 214. For example, once the detected infrared level falls below the value associate with sunlight shade or indoor incandescent light, the microprocessor algorithm assumes a default indoor illumination level, since indoor infrared levels are not well correlated to illumination levels, and controls the display device 202 to lower the level of illumination accordingly. In addition, the microprocessor algorithm may be configured to monitor the amplitude modulation reflected in the ambient light signal 212 in order to differentiate indoor incandescent illumination from sunlight and control the display 202 accordingly, e.g. increase illumination for sunlight, but not for incandescent light.

Figure 8:
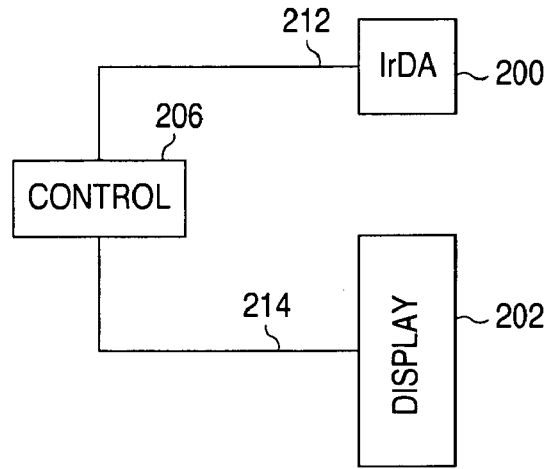
FIG. 8 is a functional block diagram illustrating an embodiment of a system having an infrared receiver wherein an ambient light signal output from an IrDA transceiver is utilized by control logic to generate a brightness control signal that is output to a display device.

FIG. 8 is a functional block diagram illustrating an embodiment wherein an ambient light signal 212 from an IrDA transceiver 200 is utilized by control logic 206 to generate a brightness control signal 214 that is output to a display device 202. In one embodiment, the ambient light signal 212 from the IrDA transceiver 200 is an analog current signal that is transformed into a digital value suitable for controlling the display device 202. FIGS. 2-6 illustrate a variety of approaches that may serve as the control logic 206 block or part of the control logic 206 block illustrated in FIG. 7. As one of ordinary skill in the art will readily appreciate, a variety of approaches may be utilized provided that the resulting brightness control signal 214 is suitable for use in controlling the display device 202 and will vary with the control input requirements of the display device 202. For example, the display device may have an internal controller that can respond to a range of brightness control signal values with a variety of brightness levels of the display. FIGS. 3-5 illustrate examples of suitable control logic circuitry for such a display 202. Alternatively, the display device 202 may have a simple Boolean input that selects between two levels of illumination response to the brightness control signal 214 input, in which case the brightness control signal 214 is a Boolean signal. FIG. 2 illustrates one example of a suitable control logic 206 circuit for such a display device 202. In these various embodiments, the control logic 206, responsive to the ambient light signal 212, produces a value of the brightness control signal 214 that is output to the display device 202 and is suitable for the particular type of display device 202.

Figure 9:
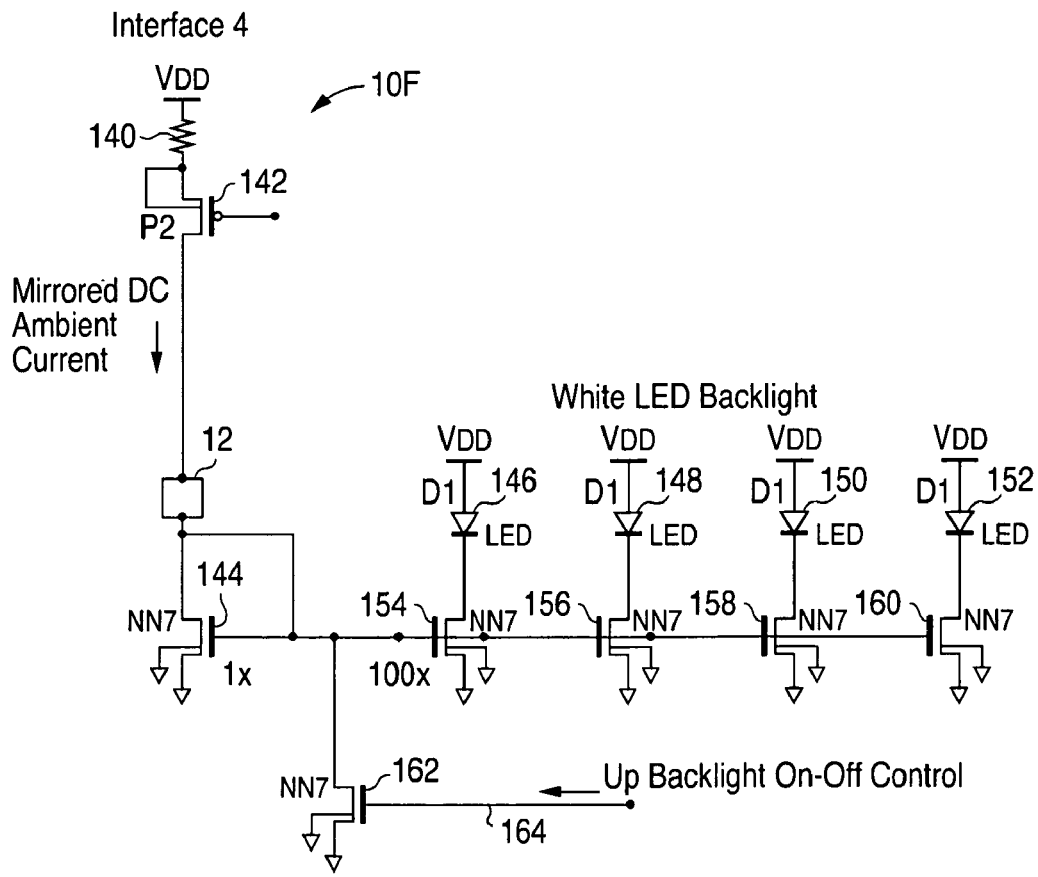
FIG. 9 is a circuit diagram illustrating an embodiment of an output interface circuit having a current mirror wherein an analog ambient light signal output from an IrDA transceiver is utilized for analog brightness control for a display device.

FIG. 9 is a circuit diagram illustrating an embodiment wherein an analog ambient light signal output 12 from an IrDA transceiver 200 is utilized for analog brightness control for a display device. In this example, a multiple output current mirror or multiple output current amplifier multiplies the level of the DC ambient light signal to directly drive several backlight white light emitting diodes (LEDs) 146, 148, 150, 152 that illuminate a display. In the circuit shown, the analog ambient light signal 12 from the IrDA is mirrored through a diode connected current mirror transistor 144 through to four drive transistors 154, 156, 158, 160 that are each coupled in series with a corresponding backlight LEDs 146, 148, 150, 152. The amount of current gain in the drive transistors is determined by the size ratio between the current mirror transistor 144 and each of the drive transistors 154, 156, 158, 160. In the example shown, the ratio is 100. Another transistor 162 has a current terminal coupled to the shared gate node for the current mirror transistor and the drive transistors and may be utilized to shut-down the backlight, such as under the control of a microprocessor.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An infrared receiver circuit configured to generate an ambient light output signal at an output pin, the receiver circuit including:

an ambient correction current transistor having a first current terminal coupled to a first power supply rail, a second current terminal for coupling to a receive photodiode, and a control terminal;

an ambient correction amplifier having an output coupled to the control terminal of the ambient correction current transistor, a first input, and a second input coupled to a reference voltage source;

a capacitor coupled between the output of the ambient correction amplifier and the first power supply rail;

a transimpedance amplifier having an output coupled to the first input of the ambient correction amplifier through a first resistor, a first input coupled to the second current terminal of the ambient correction current transistor and coupled to the output of the transimpedance amplifier through a second resistor, and a second input coupled to the reference voltage source; and an output transistor having a first current terminal coupled to the first power supply rail, a second current terminal coupled to the output pin, and a control terminal coupled to the control terminal of the ambient correction current transistor.

2. The infrared receiver circuit of claim 1, the circuit further comprising a logic buffer having an input coupled to the output pin and an output at which an illumination control signal is generated.

3. The infrared receiver circuit of claim 1, the circuit further comprising an analog to digital converter having an input coupled to the output pin and an output at which a digital ambient light level signal is generated.

4. The infrared receiver circuit of claim 3, wherein the analog to digital converter is further configured to logarithmically compress the digital ambient light level signal.

5. The infrared receiver circuit of claim 1, the circuit further comprising pulse width modulation encoder having an input coupled to the output pin and an output at which a pulse width encoded ambient light level signal is generated.

6. The infrared receiver circuit of claim 5, wherein the pulse width modulation encoder is configured to logarithmically compress the pulse width encoded ambient light level signal.

7. The infrared receiver circuit of claim 1, the circuit further comprising a current amplifier configured to control a backlight for illuminating a display.

8. A system having an infrared receiver, the system comprising:

an infrared receiver circuit configured to receive an infrared data signal using a receive photodiode for providing a decoded infrared data signal and compensating for an ambient light level incident on the receive photodiode by generating a DC ambient current signal;

an output current mirror circuit for mirroring the DC ambient current to be accessible external to the integrated circuit; and a control circuit configured to receive the mirrored DC ambient current signal and, responsive thereto, determine the ambient light level and generate a display illumination control signal accordingly.

9. The system of claim 8, where the control circuit further comprises a processor.

10. The system of claim 9, where the processor is configured to monitor the DC ambient current signal to detect outdoor light conditions and adjust the display illumination control signal for outdoor light conditions.

11. The system of claim 9, where the processor is further configured to monitor the DC ambient current signal for amplitude modulation to detect amplitude modulation corresponding to indoor light conditions and adjust the display illumination control signal for indoor light conditions.

12. The system of claim 11, where the processor is further configured to distinguish a type of source for the indoor light conditions and adjust the display illumination control signal for the type of source for the indoor light conditions.

13. The system of claim 8, where the control circuit further comprises control means for converting the DC ambient current signal to the display illumination control signal.

14. A method for display illumination control in a system having an infrared receiver, the method comprising the steps of:
receiving an infrared data signal at the infrared receiver;
generating a decoded infrared data signal responsive to the received infrared data signal;
generating a DC ambient current to compensate for an ambient light level responsive to the received infrared data signal;
mirroring the DC ambient current;
determining the ambient light level from the mirrored DC ambient current; and
generating a display illumination control signal based on the ambient light level determined from the mirrored DC ambient current.

15. The method of claim 14, wherein:
the step of determining the ambient light level from the mirrored DC ambient current includes monitoring the mirrored DC ambient current to detect outdoor light conditions; and
the step of generating a display illumination control signal based on the ambient light level determined from the mirrored DC ambient current further comprises adjusting the display illumination control signal for outdoor light conditions.

16. The method of claim 14, wherein:
the step of determining the ambient light level from the mirrored DC ambient current includes monitoring the mirrored DC ambient current for amplitude modulation to detect amplitude modulation corresponding to indoor light conditions; and
the step of generating a display illumination control signal based on the ambient light level determined from the mirrored DC ambient current further comprises adjusting the display illumination control signal for indoor light conditions.

17. The method of claim 16, wherein:
the step of monitoring the mirrored DC ambient current for amplitude modulation to detect amplitude modulation corresponding to indoor light conditions further comprises detecting indoor light conditions corresponding to an incandescent light source; and
the step of generating a display illumination control signal based on the ambient light level determined from the mirrored DC ambient current further comprises adjusting the display illumination control signal for indoor light conditions corresponding to the incandescent light source.

18. The method of claim 16, wherein:
the step of monitoring the mirrored DC ambient current for amplitude modulation to detect amplitude modulation corresponding to indoor light conditions further comprises detecting indoor light conditions corresponding to a fluorescent light source; and
the step of generating a display illumination control signal based on the ambient light level determined from the mirrored DC ambient current further comprises adjusting the display illumination control signal for indoor light conditions corresponding to the fluorescent light source.

19. The method of claim 14, the method further comprising the steps of:
accessing the mirrored DC ambient current externally to the infrared receiver circuit; and
providing a control circuit external to the infrared receiver circuit for converting the mirrored DC ambient current to the display illumination control signal.

20. The method of claim 19, where the step of providing a control circuit external to the infrared receiver circuit further comprises at least one of providing a processor and providing a control means.

* * * * *